United States Patent [19]

Shintani

[11] Patent Number: 5,512,954
[45] Date of Patent: Apr. 30, 1996

[54] TELEVISION RECEIVER WITH DECODER FOR DECODING CODED DATA FROM A VIDEO SIGNAL

[75] Inventor: Peter Shintani, Tokyo, Japan

[73] Assignee: Sony Corporation, Tokyo, Japan

[21] Appl. No.: 312,587

[22] Filed: Sep. 27, 1994

[30] Foreign Application Priority Data

Sep. 27, 1993 [JP] Japan .................................. 5-263006

[51] Int. Cl.$^6$ ....................................... H04N 5/45
[52] U.S. Cl. ........................... 348/468; 348/473; 348/589
[58] Field of Search ..................................... 348/468, 564, 348/565, 566, 706, 588, 589, 465, 473, 584, 598, 600; H04N 5/45, 5/455, 9/74

[56] References Cited

U.S. PATENT DOCUMENTS

| | | | |
|---|---|---|---|
| 4,665,438 | 5/1987 | Miron et al. | 348/566 |
| 4,977,455 | 12/1990 | Young | 348/468 |
| 4,992,782 | 2/1991 | Sakamoto et al. | 348/600 |
| 5,453,796 | 9/1995 | Duffield et al. | 348/584 |

FOREIGN PATENT DOCUMENTS

| | | | |
|---|---|---|---|
| 0536901 | 4/1993 | European Pat. Off. | H04N 5/445 |
| 0551168 | 7/1993 | European Pat. Off. | H04N 5/45 |
| 2232033 | 11/1990 | United Kingdom | H04N 5/45 |
| 9209170 | 5/1992 | WIPO | H04N 5/45 |

OTHER PUBLICATIONS

Sony Corp. TV Group; Service Manual Models: KV27TS29/27TS32/27TS36, KV32TS36/32TS46; Trinitron Color TV, Japan, 1993.3, pp. 1–119.
Sony Trinitron Color TV; "Recommended Practice for Line 21 Data Service" EIA–608, SP3191; (Draft) pp. 1–116; Jun. 17, 1993.

*Primary Examiner*—Safet Metjahic
*Assistant Examiner*—Jeffrey S. Murrell
*Attorney, Agent, or Firm*—Jerry A. Miller; Pasquale Musacchio; Peter C. Toto

[57] ABSTRACT

A television system which selectively receives additional information multiplexed in a video-signal source different from and other than a video-signal source currently being watched. A video signal V7 supplied to a CCD/EDS data extractor 7 is selected independently of a video signal V5 for a main screen of a CRT 10 or a video signal V6 for an auxiliary screen of the CRT 10 displayed by a PinP (PoutP) function. Accordingly, captions to be displayed are not limited to additional information multiplexed in the video signal V5 for the main screen displayed on the CRT 10. As a result, additional information multiplexed in a video signal for the auxiliary screen other than that for the main screen or multiplexed in an external video signal V2 can also be displayed as well.

17 Claims, 2 Drawing Sheets

TELEVISION RECEIVER WITH DECODER FOR DECODING CODED DATA FROM A VIDEO SIGNAL

FIELD OF THE INVENTION

The present invention relates to a television receiver for receiving a character multiplex broadcast and displaying received character information on a screen of the television receiver.

BACKGROUND

Character multiplex broadcasting is a system wherein picture information comprising characters and drawings as well as accompanying voice are converted into a format of digital signals before being multiplexed with the conventional video signal for transmission to a television receiver of the general user. The multiplexed signal is demodulated by the television receiver for displaying the picture information on an image receiving tube and outputting the accompanying voice to a speaker.

In particular, such a system is known in the U.S.A. as a closed caption for multiplexing character information with a video signal and displaying the character information as information added to pictures as captions. It is an object of the closed caption to allow a person who has difficulty in hearing to understand a broadcast as a normal person does. The system also provides various general information such as a weather forecast and sport news by virtue of character information appended to a picture signal along with accompanying voice.

A special decoder, that is, a closed-caption decoder is required for extracting character information multiplexed with a video signal as described above out off the multiplexed signal. The closed-caption decoder is abbreviated hereafter as the CCD. However, there are currently only a few television receivers in which a CCD is embedded therein at manufacture. In general, it is therefore necessary to purchase a decoding apparatus with a CCD embedded therein in addition to the television receiver. As a result, the CCD has not come into wide use as fast as expected. In order to solve the problem, a bill requiring that each television receiver sold or manufactured domestically after Jul. 1, 1993 be equipped with a closed-caption decoder (CCD) was passed in the U.S.A. Television sets incorporating such CCD are now available (for example the SONY®KV32TS36.)

To be sure, it is believed that there are only few cases in which the general consumer requires a CCD. The EIA (Electronic Industry Association) in EIA-608 and the consumer and producer/manufacturer groups propose that a vertical blanking period, a currently unused portion of a planned video signal, be used for a CCD system. It should be noted that the video signal is planned for use to provide extended data services (EDS) to people constituting the majority of the population.

In addition, other independent data services such as StarSight, Telidon and World Teletext Services also use the vertical blanking period of the video signal. For all the services described above, a television receiver equipped with a tuner capable of tuning to a station broadcasting desired data is therefore required.

As implied in the description given so far, some even and odd scan lines in the vertical blanking period, from the 1st to the 21st, are not used. In the closed-caption system, data is multiplexed onto the 21st scan line, line 21 of the unused odd field.

A rough configuration of the conventional television receiver is shown in FIG. 2. FIG. 2 is a block diagram showing the configuration of the conventional television set which is equipped with a closed-caption decoder (CCD). Reference numeral 1 shown in the figure is a main tuner for receiving a radio wave RF1 or a video signal V1 from an antenna. In accordance with a station-select signal S 1 from a video switch 3 to be described later, the main tuner 1 extracts a video signal with an intermediate frequency of a predetermined channel, supplying the signal to the video switch 3 as a video signal V3.

Reference numeral 2 is an auxiliary tuner. Much like the main tuner 1, the auxiliary tuner 2 is used for receiving the radio wave RF1 or the video signal V1 from the antenna. However, the auxiliary tuner 2 works independently of the main tuner 1. Likewise, in accordance with a station-select signal S2 from a microprocessor 9 to be described later, the auxiliary tuner 2 extracts a video signal with an intermediate frequency of a predetermined channel, supplying the signal to the video switch 3 as a video signal V4.

The video switch 3 provides the main tuner 1 described above and a video processor to be discussed later with the station-select S1. At the same time, the video switch 3 is controlled by a signal S3 output by the microprocessor 9 to select two from a plurality of video signals: V2, V3 and V4. As shown in the figure, the video signal V2 is a signal supplied directly from an external source. Two signals V5 and V6 are selected by the video switch 3 to be displayed on main and auxiliary screens respectively. The selected video signal V5 to be displayed on the main screen is supplied to a Y/C separator 4. The selected video signal V6 to be displayed on the auxiliary screen is, on the other hand, supplied to a picture-in-picture (PinP) circuit 5. The PinP circuit 5 may also be referred to hereafter as a picture-out-picture or picture-outside-picture (PoutP) circuit. Such PinP and PoutP circuits and the like may be collectively referred to generically herein as a multiple picture processor.

The Y/C separator 4 extracts luminance (Y) and chrominance (C) signals YCS from the video signal V5. The signals YCS are supplied to a video processor 6. The Y/C separator 4 also provides a CCD/EDS data extractor (decoder) 7 with an NTSC-system color-TV signal TVS. Thus, the decoder 7 always operates on the signal from the main video signal V5.

The PinP (PoutP) circuit 5 carries out predetermined processing on the video signal V6 supplied thereto in accordance with the size of the auxiliary screen and the display position, outputting the processed signal to the video processor 6.

Then, the video processor 6 mixes the video signals output by the Y/C separator 4 for the main screen and a video signal output by the PinP circuit 5 for the auxiliary screen. The mixed signal is supplied to an RGB switch 8 as an RGB signal.

The CCD/EDS data extractor 7 includes an embedded a data processor (or a data slicer) for extracting a caption signal from the NTSC-system color-TV signal TVS. The extracted caption signal is decoded by means of a decoder also embedded therein. Furthermore, the CCD/EDS data extractor 7 supplies a decoded result to the RGB switch 8 as a display character signal, another RGB signal, which is synchronized with a vertical/horizontal synchronization video signal.

The RGB switch 8 mixes the RGB signal comprising the video signals for the main and auxiliary screens with the other RGB signal, the caption (characters to be displayed) signal output by the CCD/EDS data extractor 7, to produce a final RGB signal. The final RGB signal is supplied to a CRT 10 for displaying video information and captions conveyed by the final RGB signal.

As described above, in the aforementioned configuration of the conventional TV receiver, the video signal V3 selected by the main tuner 1 is displayed on the main screen. The video signal V4 selected by the auxiliary tuner 2 as an auxiliary-screen signal is processed by the picture-in-picture circuit 5 and mixed with the luminance and color signals YCS by the video processor 6 before being displayed. The CCD/EDS data extractor 7 extracts a caption signal supplied along with the video signal for the main screen. The caption signal is extracted from the color-television signal TVS for the main-screen video signal provided to the CCD/EDS data extractor 7. The caption signal is decoded by the CCD/EDS data extractor 7 before being displayed on the CRT 10. Of course, the video signals for the main and auxiliary screens can be swapped with each other. In addition, it is also possible to display the electric wave RF2 input from an external source as a main or auxiliary-screen signal.

In the case of the conventional TV receiver described above, no problem is encountered as long as the user does not change the channels once selected for a television program and a data service. If the user switches the channel from a television program watched so far to another, however, the data service watched so far cannot be seen anymore even if the user desires to. This is because, every time the user changes the channel for the main screen, the channel for the data service is also changed. That is to say, the conventional TV receiver has a problem that a desired data service cannot be independently specified.

The problem described above is caused by the fact that the conventional TV receiver is designed so that only the CCD and the extended data services can be decoded. To be more specific, the conventional TV receiver allows only CCD and extended data services included in a selected video signal currently being watched to be received. As a result, with the conventional TV receiver, a data service of a specific or arbitrary channel cannot be received, giving rise to a problem that CCD data and/or EDS information from another video-signal source cannot be decoded even if the other video-signal source can be selected independently.

It is an object of the present invention to provide a TV receiver which can selectively receive additional information multiplexed in a video signal from a video-signal source different from the one currently being watched.

SUMMARY OF THE INVENTION

In order to achieve the object described above, a TV receiver according to the present invention is equipped with a decoder for decoding additional information multiplexed in a video signal so that the TV receiver can display pictures of the video signal as well as the decoded additional information. Video signals can be received from at least two video-signal sources and the video signal to be supplied to the decoder can be selected from the two or more video-signal sources independently of the video signal of pictures being displayed on the CRT. A TV receiver according to an embodiment of the present invention uses two video-signal sources which are first and second tuners respectively.

Preferably, the TV receiver has a picture-in-picture function or a picture-out-picture function for displaying pictures from one of the two video-signal sources as a main screen on the CRT and those from the other video-signal source as an auxiliary screen.

In the TV receiver provided by the present invention, a video signal to be supplied to a decoder is selected independently of a video signal conveying pictures being displayed on the CRT. As a result, additional information to be displayed on the CRT can be selected from any of the two video-signal sources, being not limited to the additional information multiplexed with the video signal being displayed on the CRT.

As described above, the two video-signal sources are from the first and second tuners respectively. In addition, the TV receiver can have a picture-in-picture function or a picture-out-picture function for displaying pictures from one of the two video-signal sources as a main screen on the CRT and those from the other video-signal source as an auxiliary screen.

According to one aspect of the present invention, a television circuit includes a television receiver having at least two video signal sources for receiving first and second video signals. A decoder decodes coded data from video signals. A video processing circuit receives video signals and processing the video signals for display on a video display. A video switch receives the first and second video signals and supplies a first selected one of the first and second video signals to the decoder for decoding, and supplies a second selected one of the first and second video signals to the video processing circuit.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DESCRIPTION OF THE INVENTION

Figure 1:
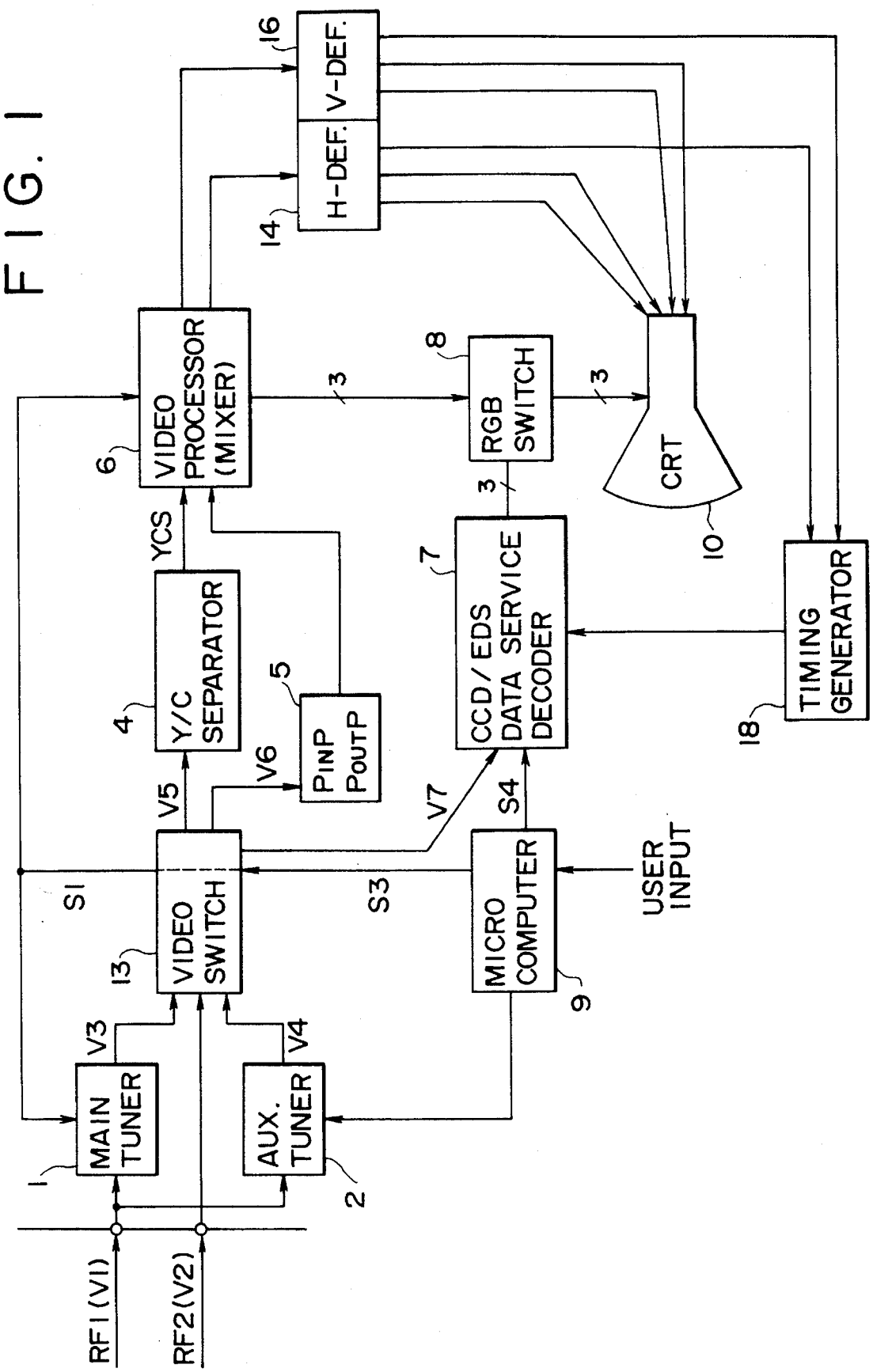
FIG. 1 is a block diagram showing the configuration of an embodiment implementing a TV receiver in accordance with the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

As described earlier, in the U.S.A., a consumer, who buys a TV receiver manufactured and sold after Jul. 1, 1993, must bear the cost of a decoder embedded therein regardless of whether the consumer and/or the producer desire the decoder or not. In order to improve the cost/performance and increase the value to the consumer, the EIA (Electronic Industry Association) of the U.S.A. proposes that the present unused portion in the remaining bandwidth of the CCD system be utilized.

To be more specific, CCD data can be placed on the 21st line of an even or second field. About 30 % of a small portion of this extended bandwidth is used for the EDS (extended data services). By placing data in the same area in this way, basic hardware for the CCD services used for extracting data from a video signal can certainly be used also for extracting necessary information from data of the extended services. Of course, EDS data has the same format as CCD data.

However, the use of a system with a low data-transfer speed for providing extended data services as in the case of the CCD service gives rise to a problem that the TV receiver must be set to receive only specific channels due to a very low data bandwidth of 60 bytes per second. As a result, the user must select only data of the extended data services from those specific channels.

Fortunately, however, a cost-effective implementable solution exists. Most recent TV receivers as well as moderately priced ordinary TV receivers each have a multiplexed video function or a function called PinP or PoutP shown in FIG. 2. The TV receivers can receive signals from two or more channels simultaneously, allowing two video signals to be displayed at the same time. In some TV receivers, one or even more additional video signals can be received from external sources.

Figure 2:
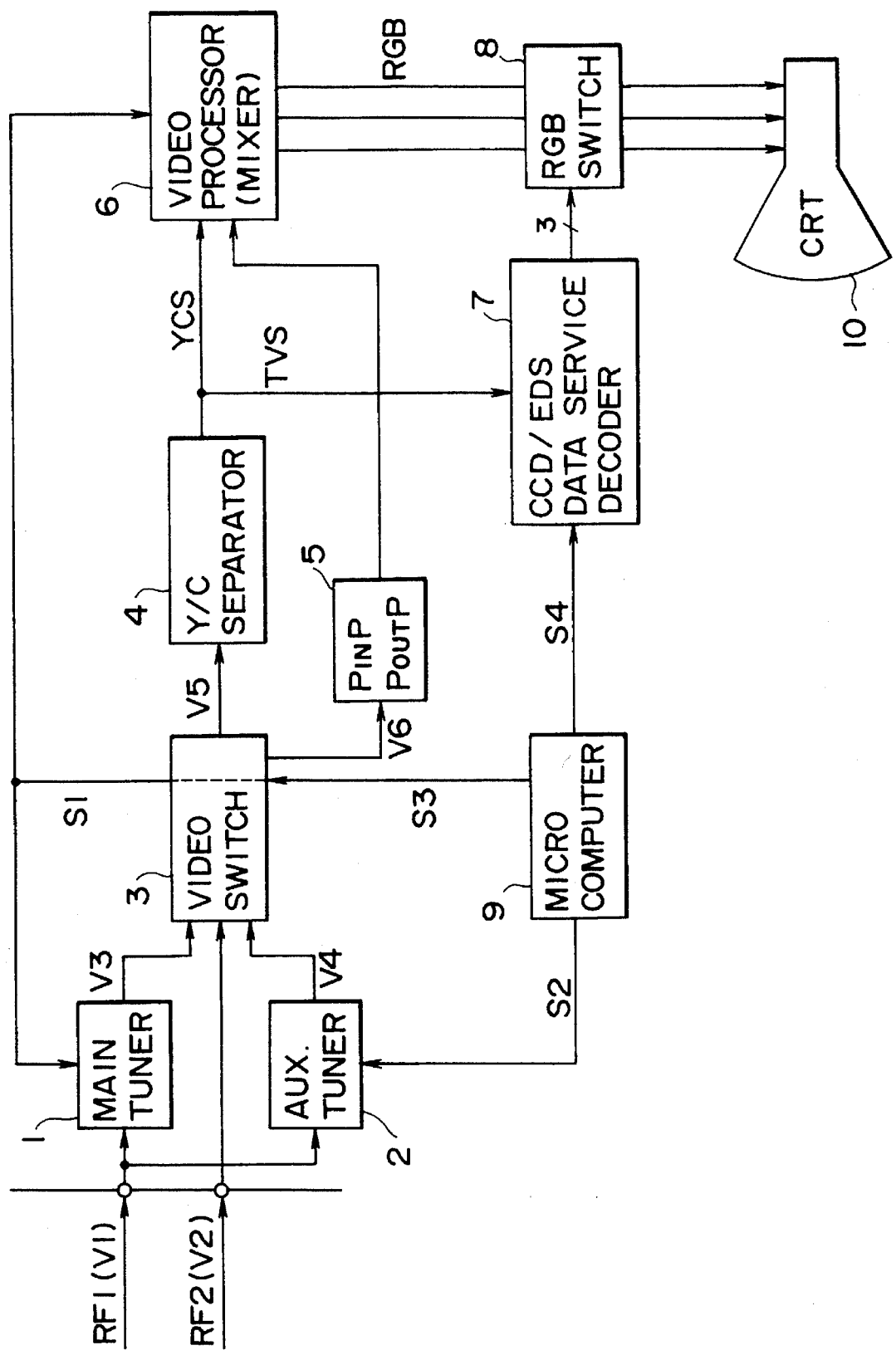
FIG. 2 is a block diagram showing the configuration of a TV receiver equipped with two tuners: the main tuner and an auxiliary tuner.

A block diagram of the configuration of an embodiment implementing a TV receiver in accordance with the present invention is shown in FIG. 1. It should be noted that portions of FIG. 1 corresponding to components shown in FIG. 2 are denoted by the same reference numerals as the components of FIG. 2 and their description is thus omitted. As described above, many recent TV receivers have a picture-in-picture (PinP) or picture-out-picture (PoutP) display function. A TV receiver having such a PinP or PoutP display function is equipped with an auxiliary tuner for supplying video and audio signals for second pictures. The channel of the video and audio signals supplied by the auxiliary tuner can be selected independently of the station of the selected first video signal.

In order to provide the capability described above, the embodiment shown in FIG. 1 has a video switch 13 that can select one of video signals V2, V3 and V4 supplied thereto and output the selected one a CCD/EDS data extractor 7 as a video signal V7 independently of main and auxiliary-screen video signals V5 and V6. In other words, the CCD/EDS data extractor 7 shown in the figure can decode a data service multiplexed in the channel of the main-screen video signal V5, the auxiliary-screen video signal V6 or the other video signal V2 in a completely independent manner.

In the vertical blanking interval (VBI) of the video signals described above, or there are some unused lines among the 1st to 21st scan lines, be they even or odd fields. In a closed-caption system, data such as captions is multiplexed on line 21 (or the 21st scan line) of the odd field. Also in the case of other services such as the EDS (Extended Data Services), Telidon, the World Teletext Services and StarSight, their data is placed in the vertical blanking interval. The EDS (Extended Data Services) and CCD adopt the same data format. Accordingly, the same data slicer (or data extractor) can be used for extracting data of either the EDS (Extended Data Services) or CCD.

In the configuration described above, a microprocessor 9 supplies a select signal S2 to an auxiliary tuner 2. The microprocessor 9 also provides the video switch 13 with a switch signal S3 for use by the video switch 13 to determine which of the video signal V3, the video signal V4 and the external video signal V2 is to be forwarded to the CCD/EDS data decoder 7. The microprocessor 9 further outputs a data extract signal S4 to the CCD/EDS data decoder 7. The video switch 13 outputs a select signal S1 to a main tuner 1 and a video processor 6 in accordance with the switch signal S3. Channels are selected by the main and auxiliary tuners 1 and 2 in accordance with the select signals S1 and S2 respectively, supplying the video signals V3 and V4 respectively to the video switch 13. Since there is often a significant delay associated with Y/C separator 4, a delay may be required in decoder 7 so that data does not arrive on the display earlier than desired in CCD.

Driven by the switch signal S3 from the microprocessor 9, the video switch 13 supplies the main-screen video signal V5 to the Y/C separator 4 and the auxiliary-screen video signal V6 to the PinP circuit 5 as well as forwards the video signal V3 or V4 or the external video signal V2 to the CCD/EDS data extractor 7 as the video signal V7. The YVC separator 4 extracts luminance (Y) and chrominance (C) signals from the main-screen video signal V5. The luminance (Y) and chrominance (C) signals are then supplied to the video processor 6. The PinP circuit 5 processes the auxiliary-screen video signal V6 before supplying it to the video processor 6. The video processor 6 mixes the main-screen video signal V5 with the auxiliary-screen video signal V6, outputting the mixed signal to the RGB switch 8 as an RGB signal.

Horizontal and vertical deflection circuits generate conventional H and V deflection signals from video processor 6 for controlling the electron beam deflection on CRT 10. A timing generator 18 generates timing signals for decoder 7 from the horizontal deflection signal in the preferred embodiment, to obtain a jitter free signal.

A data processor (or a data slicer) employed in the CCD/EDS data extractor 7 extracts a caption signal from the video signal V7. The caption signal is then decoded by a decoder also employed in the CCD/EDS data extractor 7. Furthermore, the CCD/EDS data extractor 7 supplies a decoded result to the RGB switch 8 as a display character signal, another RGB signal, which is synchronized with a vertical/horizontal synchronization video signal. The RGB switch 8 mixes the RGB signal comprising video signals for the main and auxiliary screens with the other RGB signal, the caption (characters to be displayed) signal output by the CCD/EDS data extractor 7, to produce a final RGB signal with superimposed information. The final RGB signal is supplied to a CRT. In the preferred embodiment video processor 6 and RGB switch 8 are implemented as a single integrated circuit. Also, decoder 7 and micro computer 9 are preferably implemented as a single IC micro controller using external RAM memory to hold previously decoded data.

For example, let pictures of the A channel and the B channel be displayed on the main and auxiliary screens respectively, and captions of the A channel be selected for display along with the pictures. In other words, the video signal of the A channel is supplied to the CCD/EDS extractor 7. Any arbitrary video signal can be supplied to the CCD/EDS extractor 7 through the video switch 13. Accordingly, if the user selects the display of captions of the B channel which is being displayed on the auxiliary screen, the video signal of the B channel is supplied to the CCD/EDS extractor 7. As a result, the captions of the B channel are displayed on the CRT 10. The captions of the B channel remain displayed on the CRT 10 even if the user changes the channel to be displayed on the main screen.

In addition, if the user selects the external video signal V2 which is not being displayed either on the main screen or the auxiliary screen, the video signal V2 is supplied to the CCD/EDS extractor 7. As a result, the CRT 10 displays a data service such as captions conveyed by the video signal V2 which is selected in a manner completely independent of the video signals displayed on the main and auxiliary screens.

As described above, the embodiment implements a TV receiver equipped with an auxiliary tuner having an independent tuning function. In the TV receiver, a video signal conveying a desired data service is supplied to the CCD/EDS extractor 7. As a result, it is possible to select a picture source of decoded data different from video sources to be displayed.

Most recent TV receivers are equipped with an auxiliary tuner or, at least, a second external video-signal source (e.g. a video tape recorder) that can be tuned. In the configuration of the embodiment, a video-signal source for a data extractor of the data services, the CCD/EDS extractor in this case, can thus be selected independently of a video signal on the main screen currently being watched by the user. As a result, even in the case of a simplest configuration, a specific program can be enjoyed as an independently selected source and, at the same time, closed captions of another program can also be watched as well.

Transferring data using a small bandwidth, the system described above is also useful for an extended data receiver for receiving data of large blocks. On top of that, the mode in which the data receiver can be operated independently of the main screen has another advantage of a fast response.

Even if the user is currently not watching a channel including data of a desired service, the data extractor can continuously access data included in a video signal provided by the auxiliary tuner or the external video-signal source can be set or locked. In other words, the data extractor can extract data continuously in a background mode regardless of whether the reception is turned on or off for that video source. As a result, the user does not to have to wait for a buffer of the data receiver to be updated when the user wants to inspect the output of the data extractor. This is because the buffer of the data receiver is continuously updated in the background mode. With conventional circuitry, it would take as much as about 5 seconds for the data decoder to produce the caption data, whereas the present invention can produce such data instantly by buffering the data in the background.

It should be noted that the concepts of the embodiment can also be applied to a receiver which is equipped only with a signal tuner such as an embedded video switch, the embedded video switch outputs proper video signals to a CCD/extended data service receiver and a main video processor.

Computer 9 receives control information from the user via remote control or set control in a conventional manner. Often such control results in a screen display (e.g. a bar graph depicting volume level.) Such control should allow the user to select the display priority so that the closed caption image is not overwritten by a bar graph or the like.

According to the present invention, a video signal supplied to a decoder for decoding additional information multiplexed in a video signal can be selected independently of a video signal of pictures to be displayed on a CRT, giving an effect that additional information multiplexed in a video-signal source different from a video-signal source currently being watched can be received selectively.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A television circuit, comprising in combination:
    a television receiver having at least two video signal sources for receiving first and second video signals;
    a decoder for extracting and decoding coded data as character information multiplexed into said video signals;
    a video processing circuit for receiving said video signals and processing said video signals for display on a video display; and
    switching means for receiving said first and second video signals and supplying a first selected one of said first and second video signals to said decoder for decoding said coded data, and for supplying a second selected one of said first and second video signals to said video processing circuit,
    wherein said first selected one of said video signals from said decoder, and said second selected one of said video signals from said video processing circuit, are combined so as to be displayed simultaneously on the video display.

2. The apparatus of claim 1, further comprising a first tuner and wherein said first video signal is produced by said first tuner.

3. The apparatus of claim 2, further comprising a second tuner and wherein said second video signal is produced by said second tuner.

4. The apparatus of claim 2, wherein said second video signal is received from an external video source.

5. The apparatus of claim 1, further comprising:
    a multiple picture processor for producing a secondary picture, based on said first selected one of said first and second video signals, to be merged with a main picture, based on said second selected one of said first and second video signals, for display on said video display,
    wherein said switching means further supplies said first selected one of said first and second video signals to said multiple picture processor, and
    further wherein said multiple picture processor supplies the secondary picture to said video processing circuit.

6. The apparatus of claim 5, wherein said multiple picture processor includes a picture-in-picture processor.

7. The apparatus of claim 6, wherein said multiple picture processor includes a picture-outside-picture processor.

8. The apparatus of claim 1, wherein said decoder includes a closed caption decoder.

9. The apparatus of claim 1, wherein said decoder includes a closed caption/extended data services decoder.

10. A television circuit, comprising in combination:
    a television receiver having at least three video signal sources for receiving first, second and third video signals;
    a first tuner producing said first video signal;
    a second tuner producing said second video signal;
    means for receiving said third video signal from an external video source;
    a closed caption/extended data services decoder for extracting and decoding coded data as closed caption data or extended data services data from said video signals, a multiple picture processor for producing a secondary picture, based on a first selected one of said first, second and third video signals, to be merged with a main picture, based on a second selected one of said first, second and third video signals, for display on a video display;

a video processing circuit for receiving said video signals and processing said video signals for display on said video display; and switching means for receiving said first, second and third video signals and supplying a third selected one of said first, second and third video signals to said decoder for extracting and decoding said coded data, for supplying said second selected one of said first, second and third video signals to said video processing circuit, and for supplying said first selected one of said first, second and third video signals to said multiple picture processing circuit, wherein said main picture, said secondary picture and said coded data, extracted from said third selected one of said video signals, are combined so as to be displayed simultaneously on the video display.

11. The apparatus of claim 10, wherein said multiple picture processor includes a picture-in-picture processor.

12. The apparatus of claim 10, wherein said multiple picture processor includes a picture-outside-picture processor.

13. The apparatus of claim 10, further comprising a timing generator for extracting timing from a horizontal deflection signal and for generating timing signals for said decoder therefrom.

14. A television circuit, comprising in combination:

a television receiver having at least three video signal sources for receiving first, second and third video signals, wherein the third video signal is received from an external video source;

a first tuner wherein said first video signal is produced by said first tuner;

a second tuner wherein said first video signal is produced by said second tuner;

a decoder for extracting and decoding coded data as character information multiplexed into said video signals;

a video processing circuit for receiving said video signals and processing said video signals for display on a video display;

switching means for receiving said first, second and third video signals and supplying a first selected one of said first, second and third video signals to said decoder for decoding said coded data, and for supplying a second selected one of said first, second and third video signals to said video processing circuit, wherein, said coded data from said first selected one of said video signals, and said second selected one of said video signals, are combined, so as be displayed simultaneously on the video display.

15. The apparatus of claim 14, further comprising:

a multiple picture processor for producing a secondary picture, based on said first selected one of said first, second and third video signals, to be merged with a main picture, based on said second selected one of said first, second and third video signals, for display on said video display, wherein said switching means further supplies said first selected one of said first, second and third video signals to said multiple picture processor, and further wherein said multiple picture processor supplies said secondary picture to said video processing circuit.

16. The apparatus of claim 15, wherein said multiple picture processor includes a picture-in-picture processor.

17. The apparatus of claim 15, wherein said multiple picture processor includes a picture-outside-picture processor.

* * * * *